United States Patent [19]

Berry

[11] Patent Number: 5,223,958
[45] Date of Patent: Jun. 29, 1993

[54] HEAT ACTIVATED AMUSEMENT DEVICE EMPLOYING MICROENCAPSULATED THERMOCHROMIC LIQUID CRYSTAL

[75] Inventor: John F. Berry, Defiance, Ohio

[73] Assignee: Hyperdesign, Inc., Defiance, Ohio

[21] Appl. No.: 864,170

[22] Filed: Apr. 3, 1992

Related U.S. Application Data

[63] Continuation of Ser. No. 292,498, Dec. 30, 1988, abandoned.

[51] Int. Cl.⁵ .......................... G02F 1/13; A63H 33/00
[52] U.S. Cl. ........................................ 359/43; 359/50; 359/82; 359/101; 273/146; 446/14
[58] Field of Search ................... 350/331 T, 351, 330, 350/334, 336; 340/765; 273/146, DIG. 24, DIG. 27; 446/14; 359/36, 43, 50, 82, 90, 101

[56] References Cited

U.S. PATENT DOCUMENTS

| | | | |
|---|---|---|---|
| 3,620,889 | 11/1971 | Baltzer | 350/351 |
| 3,647,279 | 3/1972 | Sharpless et al. | 350/330 |
| 3,802,945 | 4/1974 | James | 350/351 |
| 3,852,092 | 12/1974 | Patterson et al. | 359/43 |
| 3,898,354 | 8/1975 | Parker | 350/351 |
| 3,951,133 | 4/1976 | Reese | 350/351 |
| 3,980,300 | 9/1976 | Hornsby, Jr. | 350/351 |
| 4,097,128 | 6/1978 | Matsumoto et al. | 359/53 |
| 4,138,889 | 2/1979 | Fraschini | 350/351 |
| 4,501,503 | 2/1985 | Buirley et al. | 350/351 |
| 4,674,985 | 6/1987 | Orenstein et al. | 446/14 |
| 4,725,462 | 2/1988 | Kimura | 446/14 |
| 4,818,215 | 4/1989 | Taga | 446/14 |
| 4,834,500 | 5/1989 | Hilsum et al. | 350/351 |
| 4,863,282 | 9/1989 | Rickson | 250/372 |

FOREIGN PATENT DOCUMENTS 2141859 1/1985 United Kingdom ........... 350/331 R Primary Examiner—William L. Sikes
Assistant Examiner—Tai V. Duong
Attorney, Agent, or Firm—Marshall & Melhorn

[57] ABSTRACT

A heat activated amusement device is stimulated, by the transfer of thermal energy from a person's body or a heated object, to reveal by color differentiation a hidden message or visual image.

4 Claims, 1 Drawing Sheet

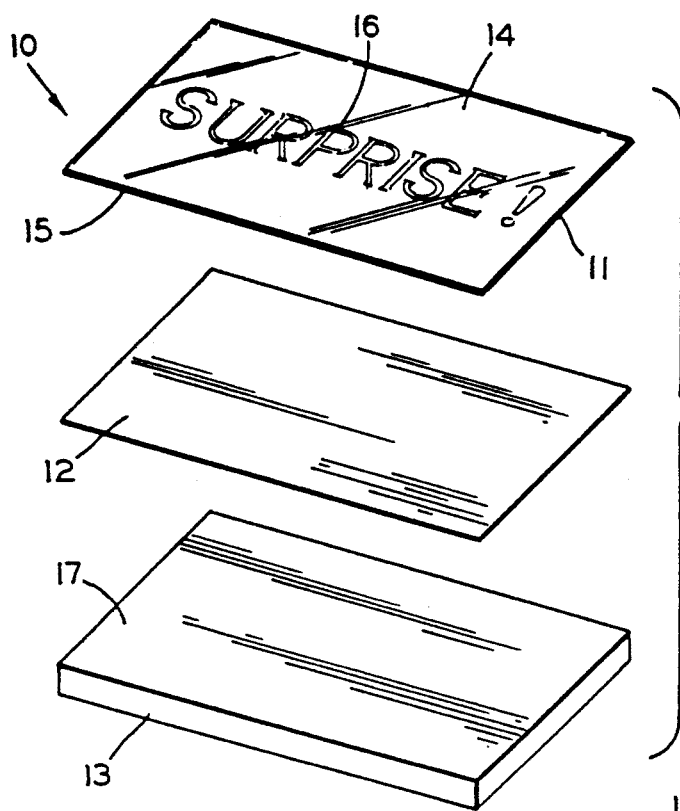
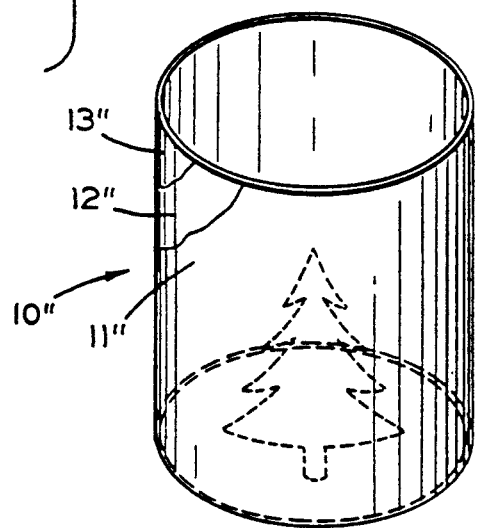
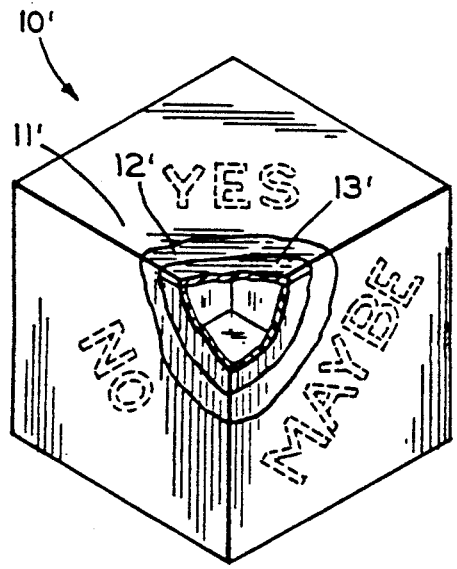
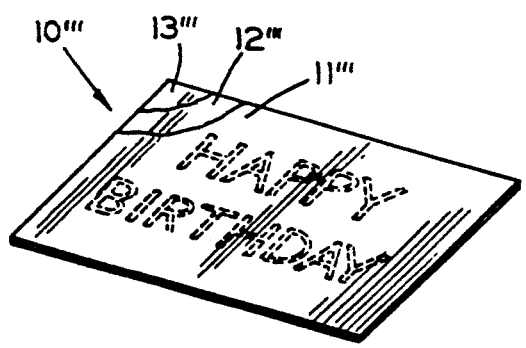
FIG. 1
FIG. 3
FIG. 2
FIG. 4

HEAT ACTIVATED AMUSEMENT DEVICE EMPLOYING MICROENCAPSULATED THERMOCHROMIC LIQUID CRYSTAL

This application is a continuation of application Ser. No. 07/292,498, filed Dec. 30, 1988, now abandoned.

FIELD OF THE INVENTION

This invention relates generally to heat activated amusement devices, and more particularly, to an amusement device in the form of a sheet, cylinder, cube, or the like, which is activated by heat to reveal a hidden message or visual image to the user.

BACKGROUND OF THE INVENTION

Visual amusement devices are typically used for occupying idle time or simply for enjoyment. One such device disclosed in U.S. Pat. No. 3,168,315, employs a die having messages printed on the facets thereof. The die reveals a message to the user when one of its facets is randomly positioned adjacent an observation window.

U.S. Pat. No. 3,802,945 discloses a novelty device in the form of a ring, pendant, tie clasp, or similar object to be worn by the user, which changes its overall color depending on temperature variations caused by ambient conditions or the wearer s body heat.

SUMMARY OF THE INVENTION

Accordant with the present invention, there is provided a heat activated amusement device comprising:

A) a transparent film, including a first surface and a second surface opposite the first surface, the second surface having printed thereon a message or visual image adapted to be viewed through the first surface of the transparent film;

B) a layer of microencapsulated thermochromic liquid crystal material, adjacent the second surface of the transparent film; and C) a substrate, including a surface adjacent the layer of microencapsulated thermochromic liquid crystal material, and having substantially the same color as the printed message or visual image of the transparent film such that the printed message or visual image is effectively hidden when viewed through the first surface of the transparent film;

wherein the printed message or visual image on the transparent film is revealed when viewed through the first surface of the transparent film, upon the transfer of thermal energy to the amusement device resulting from conductive heat transfer from a person s body or a heated object.

The amusement device of the present invention is useful for providing enjoyment and entertainment for the user

BRIEF DESCRIPTION OF THE DRAWINGS

The novel features, which are characteristic of the present invention, are set forth with particularity in the appended claims. The invention itself, however, will best be understood from the accompanying description of specific embodiments, when read in connection with the drawings, in which:

FIG. 1 is an exploded, perspective view of am amusement device incorporating the features of the present invention;

FIG. 2 is a perspective view of an amusement device incorporating the features of the present invention, assembled in the shape of a cube:

FIG. 3 is a perspective view of an amusement device incorporating the features of the present invention, assembled in the shape of a cylinder; and FIG. 4 is a perspective view of an amusement device incorporating the features of the present invention, in sheet form.

DETAILED DESCRIPTION OF THE PREFERRED EMBODIMENT

Referring now to FIG. 1 there is shown an exploded view of an amusement device, indicated generally at 10, including a transparent film 11, a layer of microencapsulated thermochromic liquid crystal material 12, and a supporting substrate 13.

The transparent film 11 has a first surface 14 and a second surface 15 opposite the first surface 14. A message or visual image 16 is printed, by any conventional printing technique, onto the second surface 15 of the transparent film 11, so as to be viewed through the first surface 14 of the transparent film 11.

A layer 12 of microencapsulated thermochromic liquid crystal material is placed adjacent the second surface 15 of the transparent film 11 This material is commercially available in sheet form, which may be adhered to the transparent film 11 by any conventional transparent pressure sensitive adhesive (not shown), such as polyvinyl butyral, or as a slurry which may be cast directly onto the second surface 15 of the transparent film 11 such that the microencapsulated thermochromic liquid crystal material layer 12 will adhere upon drying.

A supporting substrate 13 includes a surface 17 which is adjacent the layer 12 of microencapsulated thermochromic liquid crystal material. The substrate 13 and surface 17 is formed so as to present substantially the same color as the printed message or visual image 16 of the transparent film 11. The substrate 13 may be conveniently adhered at its surface 17 to the layer 12 of microencapsulated thermochromic liquid crystal material by any conventional transparent pressure sensitive adhesive (not shown); or the substrate 13 may be in the form of a layer, (not shown) having the appropriate color, applied to the microencapsulated thermochromic liquid crystal material layer 12 by any conventional method, such as by printing.

Suitable materials for preparing the transparent film 11 include, but are not limited to, polyester, polyethylene, polypropylene, polyvinyl chloride, and the like. These materials are well known in the thermoplastics art, and are commercially available. A preferred material is polyester.

The microencapsulated thermochromic liquid crystal material is generally prepared by microencapsulating cholesteryl estercarbonates or chiral nematic aryl compounds in polymeric spheres. Techniques used for microencapsulation are more fully set forth in J. E. Vandegaer, "Microencapsulation; Process and Applicationon" plenum Press (1974). Several commercially available thermochromic liquid crystal materials are sold by Hallcrest Products of Glenview, Ill. These materials are generally transparent at room temperature. Upon heating, the materials selectively reflect light of different colors, beginning with red at low heat, and passing through the other colors of the visible spectrum upon calescence, until the material again becomes transparent at a higher temperature. A preferred microencapsulated thermochromic liquid crystal material begins to reflect red light at about 25° C., and thereafter reflects blue light at about 30° C.

The substrate 13 may be formed from any suitable material upon which one desires the hidden message or visual image appear upon heating. Conveniently, the substrate may be a plastic material including, but not limited to, polyester, polyethylene, polypropylene, polyvinyl chloride, polycarbonate, polystyrene, polymethylmethacrylate, or the like, as well as a non-plastic material such as for example wood, stone, paper, etc. The color of the substrate 13 and/or surface 17 should be substantially the same as the color of the printed message or visual image 16 on the transparent film 11. The substrate 13 may be an opaque or translucent material. A preferred substrate is prepared from polyester.

In operation, at a low temperature, the message or visual image 16 is hidden when viewed through the first surface 14 of the transparent film 11, because its color blends in with and is indistinguishable from the color of the substrate 13 and/or surface 17 which is clearly visible through the transparent layer 12 of microencapsulated thermochromic liquid crystal material. As the amusement device 10 is heated, by conductive heat transfer resulting from contact with a person's body or a heated object, the layer 12 of microencapsulated thermochromic liquid crystal material begins to reflect red light, thereby masking the substrate 13 and revealing by color distinction the message or visual image 16 on the transparent film 11. Upon continued heating, the layer 12 of microencapsulated thermochromic liquid crystal material changes colors through the visual spectrum, and ultimately becomes transparent, at which time the message or visual image is again hidden from view. The speed at which the colors change will, of course, depend upon the insulating characteristics of the transparent film 11 and the substrate 13, as well as the width of the temperature range between the material's reflection of red and blue light.

FIGS. 2-4 illustrate embodiments of the present invention, which may be made either of rigid materials to form such as for example a cube 10' as in FIG. 2, or flexible materials from which for example a cylinder 10" or sheet 10''' may be formed, as shown in FIGS. 3 and 4, respectively. Like features in various embodiments are indicated by identical reference numerals having one, two, or three primes. It is readily apparent that virtually any message or visual image may be printed on the second surface 15 of the transparent film 11, according to the present invention; or alternatively that no message or visual image might be printed on the second surface 15 of the transparent film 11, thus permitting full view of the microencapsulated thermochromic liquid crystal material layer's changing color presentation.

While certain representative embodiments and details have been shown for the purpose of illustrating the present invention, it will be apparent to those ordinarily skilled in the art that various changes in applications can be made herein, and that the invention may be practiced otherwise than as specifically illustrated and described without departing from its spirit and scope.

What is claimed is:

1. A heat activated amusement device comprising:
A) a flexible plastic transparent film, including a first surface and a second surface opposite the first surface, the second surface having positively printed thereon a message or visual image in a predetermined color adapted to be viewed through the first surface of said transparent film;
B) a flexible sheet of microencapsulated thermochromic liquid crystal material which is optically transparent at room temperature, adjacent the second surface of said transparent film; and
C) a flexible plastic substrate, including a surface adjacent said flexible sheet of microencapsulated thermochromic liquid crystal material, said substrate having substantially the same color as the printed message or visual image of said transparent film such that the printed message or visual image is effectively hidden when viewed through the first surface of said transparent film in the absence of the transfer of thermal energy to said amusement device;
wherein the printed message or visual image on said transparent film is revealed when viewed through the first surface of said transparent film, upon a variable and colored background created by the selective reflection of colored light by said flexible sheet of microencapsulated thermochromic liquid crystal material in response to the transfer of thermal energy to said amusement device resulting from conductive heat transfer from a person's body or a heated object.

2. A heat activated amusement device comprising:
A) a flexible plastic transparent film, including a first surface and a second surface opposite the first surface, the second surface having positively printed thereon a message or visual image in a predetermined color adapted to be viewed through the first surface of said transparent film;
B) a flexible sheet of microencapsulated thermochromic liquid crystal material which is optically transparent at room temperature, and which upon heating begins to reflect red light at about 25° C. and thereafter reflects blue light at about 30° C., said flexible sheet adhered to the second surface of said transparent film; and
C) a flexible plastic substrate, including a surface adjacent said flexible sheet of microencapsulated thermochromic liquid crystal material, said substrate having substantially the same color as the printed message or visual image of said transparent film such that the printed message or visual image is effectively hidden when viewed through the first surface of said transparent film in the absence of the transfer of thermal energy to said amusement device;
wherein the printed message or visual image on said transparent film is revealed when viewed through the first surface of said transparent film, upon a variable and colored background created by the selective reflection of colored light by said flexible sheet of microencapsulated thermochromic liquid crystal material in response to the transfer of thermal energy to said amusement device resulting from conductive heat transfer form a person's body or a heated object.

3. The heat activated amusement device of claim 1, wherein the first surface of said transparent film substantially defines a planar structure.

4. The heat activated amusement device of claim 2, wherein the first surface of said transparent film substantially defines a cylinder.

* * * * *